Sept. 20, 1949.　　　T. D. PENNINGTON　　　2,482,504
INCLINOMETER
Filed Aug. 12, 1946　　　　　　　2 Sheets-Sheet 1
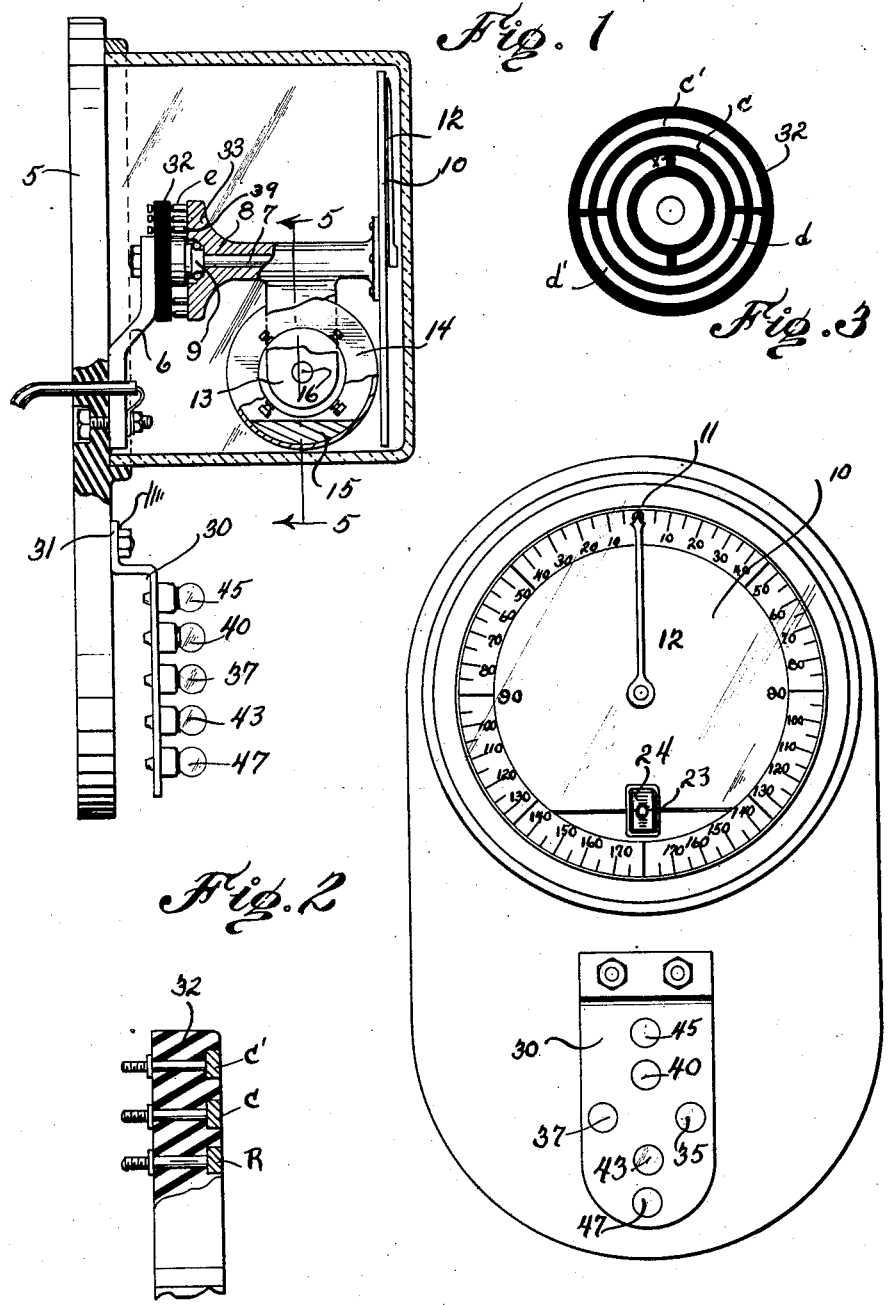
INVENTOR.
Thomas D. Pennington
BY
Shepherd & Campbell
attys.

Sept. 20, 1949.  T. D. PENNINGTON  2,482,504
INCLINOMETER
Filed Aug. 12, 1946  2 Sheets-Sheet 2

INVENTOR.
Thomas D. Pennington
BY Shepherd Campbell
Attorneys

Patented Sept. 20, 1949

2,482,504

UNITED STATES PATENT OFFICE 2,482,504

INCLINOMETER

Thomas D. Pennington, Bridgeton, N. J.

Application August 12, 1946, Serial No. 689,919

4 Claims. (Cl. 33—215)

The object of this invention is to provide a novel inclinometer for use upon aircraft, designed to indicate through 360 degrees, either the lateral or longitudinal tilting of such aircraft, or any combination of such lateral and longitudinal tilting.

The means by which I accomplish the foregoing object and the many advantages flowing therefrom will be best understood by reference to the accompanying drawings, wherein:

Figure 1 is a view partly in longitudinal section and partly in side elevation, of an inclinometer constructed in accordance with the invention;

Figure 2 is a front elevation of the same;

Figure 3 is a face view of an electric current distributor hereinafter described;

Figure 4 is a fragmentary sectional view through the distributor of Figure 3;

Figure 5:
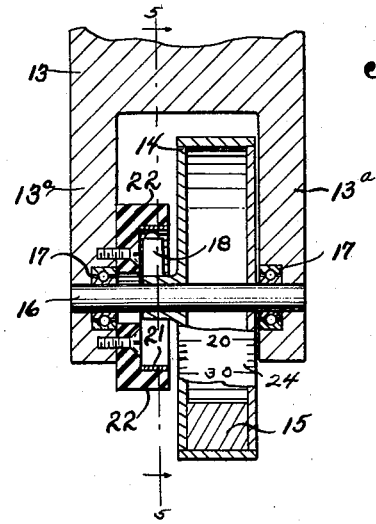
Figure 5 is a vertical sectional view upon line 5—5 of Figure 1, through a contact making structure hereinafter described.
Figure 6:
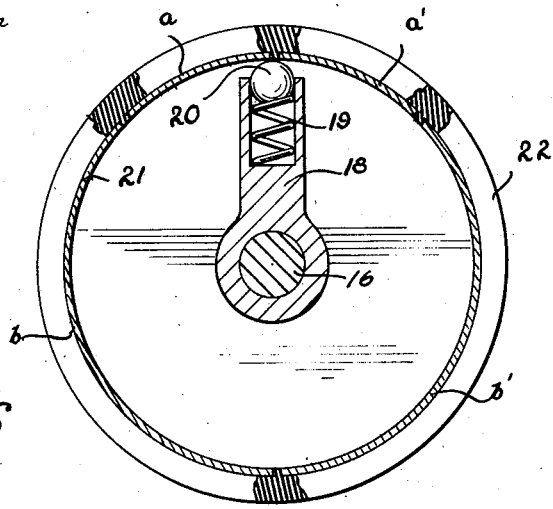
Figure 6 is a sectional view through the structure of Figure 5, at right angles to the showing of Figure 5.
Figure 7:
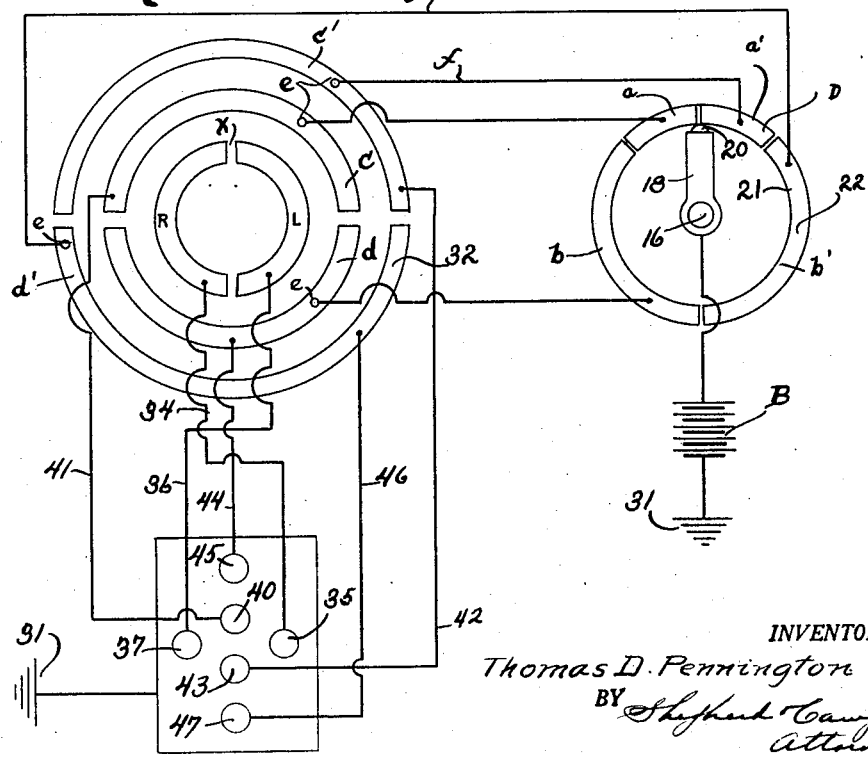
Figure 7 is a diagrammatic view of the wiring employed.

In the particular form of invention which I have chosen for purposes of illustration, 5 designates a base of wood or other non-conductive material that is adapted to be secured to the instrument board of an airplane in front of the pilot. A bracket 6 supports a rod or shaft 7. A sleeve 8 is mounted upon said shaft preferably by anti-friction bearings 9. At its forward end this sleeve carries a dial disk 10 that is graduated in each direction through 180° from its zero point 11. The forward end of the rod 7 carries a pointer 12. This pointer coacts with the scale constituted by the graduations upon the disk.

Depending from and rigidly affixed to sleeve 8 is a hanger 13, which with the parts mounted thereon constitutes a pendulum, which pendulum tends to hold the graduated disk 10 in a fixed position. The pointer 12 moves over the graduated disk, either to right or left of its zero point under the lateral tilt of the plane as it banks either to right or left.

To indicate the fore and aft tilting of the plane I mount in the lower end of hanger 13 a drum 14. This drum carries a weight 15 at its lower portion. Thus the drum constitutes a second pendulum that is carried bodily by the first pendulum hanger 13 and the weight 15 acts as a pendulum element to resist movement of sleeve 8 and to resist rotation of the drum 14. Hanger 13 is bifurcated at its lower end to receive the drum, said drum being fixed upon a shaft 16 that is mounted upon anti-friction bearings 17 in the arms 13a, of hanger 13. A contact arm 18, fixed to shaft 16, carries a spring 19 which forces a steel ball 20 outwardly and into contact with the inner periphery of the rim 21 of a contact disk 22. This disk is of non-conductive material, such as fibre, and upon the inner periphery of its rim it carries arcuate contact strips $a$, $a'$, $b$, $b'$. The local pendulous action of the drum 14 tends to hold arm 18 stationary, while the contact disk turns with respect to said arm as the plane tilts upwardly or downwardly in its longitudinal plane. The said contact disk is fixed to the hanger 13 and swings about the pendulum held shaft 16. The periphery of the drum 14 is graduated from 0 to 180 degrees in both directions from its zero point and when the plane is upon an even keel the zero point coincides with a line 23 which constitutes an artificial horizon, said line being formed upon the lower portion of disk 10 and the scale 24 upon the periphery of the drum being visible through a sight opening 25 formed in disk 10. Since the drum tends to remain stationary under the action of its pendulous weight, the movement of the line 23 over scale 24 as the plane longitudinally tilts, gives a degree by degree reading of the extent of said tilting through 180° in either an up or down direction. In like manner the movement of pointer 12 past its disk 10 gives a degree by degree reading of the lateral tilt or bank of the plane in either direction through 180°. I may, if desired, color the periphery of the drum 14, making the area at the zero point white, the area from about the zero to 20° mark, white, from the 20 to 40 degree marks, yellow, the areas from 40 to 60 degree marks, orange, and the areas beyond that, red. Although this is a matter of choice and is merely an aid in visually indicating to the pilot the degree of abnormality of the tilt.

In addition to the readings in degrees as heretofore described, I provide a group of lights intended to give a quick indication to the pilot of any departure from level flight and without requiring him to divert his attention from the controls, in times of emergency.

To this end I mount upon the base 5 a group of lights disposed in the general form of a cross, and comprising an "up" white light, a "down" white light, a "left" white light, a "right" white light, and an "up" red light and a "down" red light. These lights consist of incandescent bulbs, the sockets of which are carried by a metallic plate 30 which plate may be electrically grounded at 31. A fixed fibre distributor disk 32 is secured to the rod 7 and presents at its front face a group of arcuate contact strips $c$, $c'$, $d$, $d'$, which respectively have electric connection with the contact strips $a$, $a'$, $b$, $b'$, through the medium of brushes $e$ and conductors $f$. These brushes may be and preferably are like the contact arm 18, having a spring 19 and ball 20. This is a common mechanical expedient and needs no further description. These brushes are fixed in and move with a hub-like extension 33 of sleeve 8. Insofar as the strips $c$, $c'$, $d$, $d'$ are concerned, these function merely as current distributing means, the selected contact for these being made by arm 18 and associated parts. However, I also provide upon the face of the distributor disk 32 a pair of arcuate strips R and L, the strip R being connected by a conductor 34 with the "right" white light 35 and the strip L being connected by a conductor 36 with the "left" white light 37. The hub-like extension 33 of sleeve 8 carries a contact brush 39 which as long as the plane rides upon an even lateral keel, rests upon a nonconductive area X, between the strips R and L. However, upon banking in either direction, this brush will connect with the strips R or L and the corresponding light 35 or 37 will be lighted. This action will be brought about by movement of the strips R and L, with respect to the brush, rather than by movement of the brush with respect to the strips, because the action of the pendulum constituted by the hanger 13 and associated parts tends to hold the sleeve 8 and the brush 39 stationary, while the disk 32 tends to turn bodily with the plane as the latter banks.

It will be observed that the strips $a$, $a'$, occupy only about 45° each, therefore during the first 45° of upward tilt, the "up" white light 40 will be lighted, the contact being from $a$, $c$ and thence through conductor 41, to the center contact of light 40. Upon a downward tilt connection will be from $a'$ and its associated conductor $f$, and brush $e$ to distributor strip $c'$, thence through conductor 42 to the "down" white light 43. If the degree of upward tilt should be sufficiently steep to bring $b$ into engagement with contact arm 18, then $b$ will be connected to $d$ and through $d$ and conductor 44 with the upward light 45.

If the degree of downward tilt should be sufficiently great to bring $b'$ into engagement with contact arm 18, then $b'$ will be connected by its conductor $f$ and associated brush $e$ with arcuate strip $d'$ and through said arcuate strip and conductor 46 with the "down" red light 47.

The brushes $e$ are suitably insulated from the hub-like extension 33 and the contact strips $c$, $c'$, $d$, $d'$, R and L, are provided upon the rear side of the distributor disk 32 with suitable binding posts for the attachment of the wires leading to the lights. It is thought that the tracings of a complete circuit to one of the up and down lights will make sufficiently clear how these various lights are energized. A source of current, such as the battery B is connected at one side to any suitable point upon the mechanism, such for example as the bracket 6. The circuit to light 43, for example, would then be through bracket 6, rod 7, sleeve 8, hanger 13, shaft 16, contact arm 18, strip or segment $a'$, one of the conductors $f$ and brushes $e$ to strip or segment $c'$, thence through conductor 42 to the center contact of light bulb 43, thence through the lamp socket of said bulb to the base and back to ground or other side of the battery at 31. The brushes $e$ for all of the fore and aft tilt indicating lights, namely 40, 43, 45 and 47 are insulated from hub 33 and consequently from each other. The circuit for the lateral tilt or "bank" lights would be from bracket 6, rod 7, sleeve 8, hub 33, brush 39 (which is not insulated from hub 33) strip R or L, as the case may be, conductor 34 or 36 to the lights 35 or 37 and thence through base plate 30 to ground or return lead 31.

I wish it to be understood that the electrical connections may be varied at will as long as they are such as to accomplish the foregoing objects. Also, that many other changes may be made in the details of construction without departure from my basic idea. As far as I am aware, I am the first to provide an inclinometer comprising two pendulums one of which is carried bodily by the other and the weight of which affects said other pendulum, one of said pendulums controlling indicating means for indicating the lateral tilt of a plane and the other of which controls indicating means for indicating the longitudinal tilt of the plane and each of these being operative through a total of 360° or 180° from normal in both directions. Also, I believe it to be novel with me to secure a fine indication by dials and pointers of the respective inclinations and a coarser indication as by lights, of the same. Note that the plane can turn completely over without disrupting the readings of the dials 10 and 24 and associated indicators.

Therefore, it is to be understood that the invention includes within its purview whatever changes fairly come within either the terms or the spirit of the appended claims.

Having described my invention, what I claim is:

1. In an inclinometer for registering both the longitudinal and lateral tilt of an airplane, a fixed shaft, means for supporting said shaft upon an airplane with its axis parallel to the longitudinal axis of the airplane, a sleeve mounted upon said shaft, said shaft being capable of complete rotation in said sleeve through 360 degrees, a pendulum depending from said sleeve and resisting movement of said sleeve under lateral tilting of the plane, a second pendulum mounted in the lower portion of the first named pendulum and about an axis disposed transversely of the plane, a graduated dial fixed to the said sleeve, a pointer carried by the shaft and coacting with said dial, graduations upon the second pendulum and an indicating element upon the first named dial coacting with the graduations upon the second pendulum.

2. A structure as recited in claim 1, wherein the second named pendulum is in the form of a rotative drum having a weight in its lower portion.

3. A structure as recited in claim 1, wherein the second pendulum is mounted upon the shaft which constitutes its axis of rotation, said shaft being supported in the depending first-named pendulum, said second pendulum being capable of rotation through 360° about its axis.

4. A structure as recited in claim 1, wherein the first-named dial is provided with a sight opening through which the periphery of the second pendulum is visible, the indicating means of the second pendulum comprising a scale upon the periphery of said pendulum and wherein said second pendulum is in the form of a weighted circular drum.

THOMAS D. PENNINGTON.

REFERENCES CITED

The following references are of record in the file of this patent:

UNITED STATES PATENTS

| Number | Name | Date |
| --- | --- | --- |
| 1,288,579 | Hawley | Dec. 24, 1918 |
| 1,346,547 | Lackland | July 13, 1920 |
| 1,393,318 | Saxton | Oct. 11, 1921 |
| 1,411,883 | Fisher | Apr. 4, 1922 |
| 1,853,510 | Cunningham | Apr. 12, 1932 |
| 1,884,728 | Kiesel | Oct. 25, 1932 |
| 2,171,156 | Lawton | Aug. 29, 1939 |
| 2,286,014 | Rowe | June 9, 1942 |
| 2,323,693 | Walton | July 6, 1943 |
| 2,328,730 | Lorenzen | Sept. 7, 1943 |

FOREIGN PATENTS

| Number | Country | Date |
| --- | --- | --- |
| 416,057 | France | 1910 |
| 13,828 | Great Britain | 1914 |
| 164,396 | Great Britain | 1921 |